US006378654B1

(12) United States Patent
Ziaylek, Jr. et al.

(10) Patent No.: US 6,378,654 B1
(45) Date of Patent: Apr. 30, 2002

(54) LADDER PIVOTALLY ATTACHED TO A GENERALLY VERTICALLY EXTENDING SURFACE

(76) Inventors: Theodore Ziaylek, Jr., 140 Riverview Dr.; Michael P. Ziaylek, 15 Cold Spring Ave.; Theodore P. Ziaylek, 152 Riverview Ave., all of Yardley, PA (US) 19067

(*) Notice: Subject to any disclaimer, the term of this patent is extended or adjusted under 35 U.S.C. 154(b) by 0 days.

(21) Appl. No.: 09/618,918

(22) Filed: Jul. 18, 2000

(51) Int. Cl.$^7$ .................................................. E04G 3/00

(52) U.S. Cl. ........................... 182/97; 182/88; 182/127; 182/194; 280/166

(58) Field of Search .............................. 182/96, 97, 98, 182/93, 88, 127, 194; 280/166

(56) References Cited

U.S. PATENT DOCUMENTS

| | | | | |
|---|---|---|---|---|
| 213,429 A | * | 3/1879 | Kirkham | 182/97 |
| 1,205,684 A | | 11/1916 | Tothill | |
| 2,246,985 A | * | 6/1941 | Pellegrini | 182/97 |
| 2,794,583 A | | 6/1957 | Ernst | |
| 2,840,290 A | | 6/1958 | Roberts | |
| 3,172,499 A | * | 3/1965 | Stairs | 182/97 |
| 3,176,334 A | * | 4/1965 | Lovdahl | 182/97 X |
| 3,480,107 A | | 11/1969 | Goodhue | |
| 3,493,077 A | * | 2/1970 | Doten | 182/88 |
| 3,545,567 A | | 12/1970 | Dohrman | |
| 3,563,342 A | | 2/1971 | Lasiter | |
| 4,008,838 A | | 2/1977 | Correll | |
| 4,067,588 A | | 1/1978 | Morge et al. | |
| 4,079,815 A | | 3/1978 | Cormier | |
| 4,139,078 A | | 2/1979 | Keller | |
| 4,151,895 A | | 5/1979 | Rasada, Jr. et al. | |
| 4,161,997 A | | 7/1979 | Norman | |
| 4,170,331 A | | 10/1979 | Faulstich | |
| 4,243,120 A | | 1/1981 | Pratt, Jr. et al. | |
| 4,245,716 A | | 1/1981 | Rayfield | |
| 4,249,683 A | | 2/1981 | Park | |
| 4,262,834 A | | 4/1981 | Nutt | |
| 4,365,689 A | | 12/1982 | Dever | |
| 4,390,117 A | | 6/1983 | Fagan | |
| 4,408,680 A | | 10/1983 | Ross | |
| 4,431,082 A | | 2/1984 | Bott | |
| 4,492,286 A | | 1/1985 | Lemire | |
| 4,537,283 A | | 8/1985 | Humes | |
| 4,556,125 A | | 12/1985 | Johnson | |
| 4,618,083 A | | 10/1986 | Weger, Jr. | |
| 4,724,925 A | | 2/1988 | Ritten | |
| 4,757,876 A | * | 7/1988 | Peacock | 182/97 |
| 4,813,585 A | | 3/1989 | Nutt | |
| 4,858,725 A | | 8/1989 | Griffin | |
| 4,909,352 A | | 3/1990 | McComb | |
| 4,958,979 A | * | 9/1990 | Svensson | 182/88 X |
| 5,046,582 A | | 9/1991 | Albrecht | |

(List continued on next page.)

Primary Examiner—Bruce A. Lev
(74) Attorney, Agent, or Firm—Sperry, Zoda & Kane

(57) ABSTRACT

A ladder attached to a generally vertically extending wall or surface which is particularly useful when attached to the side of vehicles which can pivot outwardly to a slight extent at the bottom area thereof in order to increase the climbing inclination to make it easier to climb vertically for emergency personnel under emergency situations and especially when carrying heavy equipment or other necessary emergency apparatus. The ladder configuration is pivotal between a storage position extending generally vertically next to the wall and a deployed position or extended position set at the inclination angle to facilitate climbing thereof. A resilient locking device can secure the ladder in the collapsed position and a pivotally movable scissors assembly controls movement of the lower portion of the ladder between the inclined position and the vertical position.

20 Claims, 4 Drawing Sheets

U.S. PATENT DOCUMENTS

| | | |
|---|---|---|
| 5,058,791 A | 10/1991 | Henriquez et al. |
| 5,064,022 A | 11/1991 | Graham |
| 5,172,952 A | 12/1992 | Lasnetski |
| 5,174,411 A | 12/1992 | Oliver et al. |
| 5,186,588 A | 2/1993 | Sutton et al. |
| 5,228,707 A | 7/1993 | Yoder |
| 5,255,757 A | 10/1993 | Horowitz et al. |
| 5,297,912 A | 3/1994 | Levi |
| 5,366,052 A | 11/1994 | Keh-Lin |
| 5,398,778 A | 3/1995 | Sexton |
| 5,438,925 A * | 8/1995 | Ohmi et al. .............. 182/97 X |
| 5,469,933 A | 11/1995 | Thomason |
| 5,518,357 A | 5/1996 | Ziaylek, Jr. et al. |
| 5,538,100 A | 7/1996 | Hedley |
| 5,617,930 A * | 4/1997 | Elia .............................. 182/97 |
| 5,632,591 A | 5/1997 | Henriquez |
| 5,687,813 A | 11/1997 | Bensch |
| 5,743,702 A | 4/1998 | Gunderson |
| 5,850,891 A | 12/1998 | Olms et al. |
| 5,878,836 A | 3/1999 | Huang |
| 5,918,488 A | 7/1999 | Deeter |
| 5,967,257 A | 10/1999 | Begin et al. |
| 5,988,316 A | 11/1999 | Hedley |
| 6,003,633 A | 12/1999 | Rolson |
| 6,012,545 A | 1/2000 | Faleide |
| 6,029,775 A | 2/2000 | Hedley et al. |

\* cited by examiner

LADDER PIVOTALLY ATTACHED TO A GENERALLY VERTICALLY EXTENDING SURFACE

BACKGROUND OF THE INVENTION

1. Field Of The Invention

The present invention deals with the field of devices for providing access vertically up along walls such as particular the side walls of an emergency vehicle. Emergency vehicles commonly have vertically extending ladders on the sides or back portions thereof to facilitate access to the heavy equipment normally stored above the emergency vehicle itself. Climbing such vertical ladders is difficult especially when fully clothed in an emergency outfit such as a fireman's outfit or an emergency medical technician's outfit. Also once the heavy material stored on the upper portions of the emergency vehicle is retrieved these devices must be carried downwardly by the fireman or emergency personnel which is much more difficult on a vertically extending ladder and is much more comfortable and can be accomplished much faster on an inclined ladder. As such, the present invention provides a means for converting a vertically extending ladder to an inclined ladder particularly usable against the vertically extending surface of an emergency vehicle which can be easily moved to a position of deployment as well as easily moved to a position of storage for transport.

2. Description Of The Prior Art

Numerous prior art devices have been utilized for the purpose of providing access vertically along walls or vertically extending side walls of vehicles for emergency personnel and in other applications such as U.S. Pat. No. 1,205,684 patented Nov. 21, 1916 to W. S. Tothill on a "Supporting Means For Inclined Ladders"; and U.S. Pat. No. 2,794,583 patented Jun. 4, 1957 to W. Ernst and assigned to The Commonwealth Engineering Company of Ohio on a "Press Ladder Construction"; and U.S. Pat. No. 2,840,290 patented Jun. 24, 1958 to J. F. Roberts and assigned to Eric Ladd on "Telescopic Ladders"; and U.S. Pat. No. 3,480,107 patented Nov. 25, 1969 to J. B. Goodhue on a "Climbing Apparatus Adapted For Installation On Piers And The Like"; and U.S. Pat. No. 3,545,567 patented Dec. 8, 1970 to C. A. Dohrman on "Retractable Folding Steps"; and U.S. Pat. No. 3,563,342 patented Feb. 16, 1971 to E. Lasiter on a "Truck Ladder"; and U.S. Pat. No. 4,008,838 patented Feb. 22, 1977 to R. R. Correll on a "Ladder Rack"; and U.S. Pat. No. 4,067,588 patented Jan. 10, 1978 to M. Morge et al and assigned to Caterpillar Tractor Co. on a "Ladder Assembly For Construction Vehicles"; and U.S. Pat. No. 4,079,815 patented Mar. 21, 1978 to J. J. Cormier on an "Extensible Step Assembly"; and U.S. Pat. No. 4,139,078 patented Feb. 13, 1979 to J. R. Keller on a "Ladder Assembly"; and U.S. Pat. No. 4,151,895 patented May 1, 1979 to F. Rasada, Jr. et al on a "Recreational Vehicle Ladder"; and U.S. Pat. No. 4,161,997 patented Jul. 24, 1979 to T. W. Norman on a "Self-Storing Step Structure For Vehicular Mounting"; and U.S. Pat. No. 4,170,331 patented Oct. 9, 1979 to E. W. Faulstich on a "Vehicle Ladder Rack"; and U.S. Pat. No. 4,243,120 patented Jan. 6, 1981 to D. Pratt, Jr. et al and assigned to Harnischfeger Corporation on a "Retractable Boarding Ladder"; and U.S. Pat. No. 4,245,716 patented Jan. 20, 1981 to J. F. Rayfield and assigned to Sperry Corporation on a "Vehicle Access Ladder"; and U.S. Pat. No. 4,249,683 patented Feb. 10, 1981 to J. R. Park on a "Combination Ladder And Spare Tire Carrier"; and U.S. Pat. No. 4,262,834 patented Apr. 21, 1981 to W. H. Nutt and assigned to Teledyne Canada, Limited on a "Ladder Rack"; and U.S. Pat. No. 4,365,689 patented to F. Dever on Dec. 28, 1982 on a "Tilting Marine Ladder"; and U.S. Pat. No. 4,390,117 patented Jun. 28, 1983 to M. W. Fagan on a "Ladder Rack For Vehicle"; and U.S. Pat. No. 4,408,680 patented Oct. 11, 1983 to D. O. Ross on a "Ladder Support Assembly"; and U.S. Pat. No. 4,431,082 patented Feb. 14, 1984 to J. A. Bott on a "Vehicle Ladder"; and U.S. Pat. No. 4,492,286 patented Jan. 8, 1985 to D. H. Lemire on a "Truck Mounted Ladder Assembly"; and U.S. Pat. No. 4,537,283 patented Aug. 27, 1985 to A. F. Humes on a "Ladder Assembly"; and U.S. Pat. No. 4,556,125 patented Dec. 3, 1985 to R. J. Johnson on a "Method Of Installing A Pivotal Ladder To A Vehicle"; and U.S. Pat. No. 4,618,083 patented Oct. 21, 1986 to K. F. Weger, Jr. and assigned to Knaack Mfg. Co. on a "Ladder Clamping Device For Vehicle Rack"; and U.S. Pat. No. 4,724,925 patented Feb. 16, 1988 to R. G. Ritten and assigned to Step-On Inc. on "Boat Boarding Ladders"; and U.S. Pat. No. 4,813,585 patented Mar. 21, 1989 to W. H. Nutt and assigned to Teledyne Canada Limited on a "Ladder Rack"; and U.S. Pat. No. 4,858,725 patented Aug. 22, 1989 to L. H. Griffin on a "Ladder Brace"; and U.S. Pat. No. 4,909,352 patented Mar. 20, 1990 to K. McComb on a "Ladder Support System"; and U.S. Pat. No. 5,046,582 patented to L. N. Albrecht on Sep. 10, 1991 on a "Foldable Ladder Combination With Truck Cargo Carrier"; and U.S. Pat. No. 5,058,791 patented Oct. 22, 1991 to K. R. Henriquez et al and assigned to Slide-Out, Inc. on a "Vehicular Ladder Rack"; and U.S. Pat. No. 5,064,022 patented Nov. 12, 1991 to G. W. Graham and assigned to Marrowbone Development Company on a "Ladder Apparatus And Method For Large Mobile Equipment"; and U.S. Pat. No. 5,172,952 patented Dec. 22, 1992 to R. Lasnetski on an "Overhead Storage Rack For Storing Ladders Or The Like"; and U.S. Pat. No. 5,174,411 patented Dec. 29, 1992 to D. P. Oliver et al and assigned to Abru Aluminum Limited on "Ladder Improvements"; and U.S. Pat. No. 5,186,588 patented Feb. 16, 1993 to C. W. Sutton et al on a "Ladder Rack Ladder Latch"; and U.S. Pat. No. 5,228,707 patented Jul. 20, 1993 to C. T. Yoder and assigned to Carriage, Inc. on a "Retractable Vehicle Step"; and U.S. Pat. No. 5,255,757 patented Oct. 26, 1993 to M. Horowitz et al and assigned to Martin Horowitz on a "Collapsible Ladder"; and U.S. Pat. No. 5,297,912 patented Mar. 29, 1994 to A. Y. Levi and assigned to JAJ Products, Inc. on a "Ladder Rack For Motor Vehicles"; and U.S. Pat. No. 5,366,052 patented Nov. 22, 1994 to J. Lin on a "Reversible Folding Ladder"; and U.S. Pat. No. 5,398,778 patented Mar. 21, 1995 to R. Sexton on a "Ladder Rack Securing And Release System"; and U.S. Pat. No. 5,469,933 patented Nov. 28, 1995 to J. Thomason on a "Vehicle Mounted Ladder"; and U.S. Pat. No. 5,518,357 patented May 21, 1996 to T. Ziaylek, Jr. et al and assigned to Theodore Ziaylek, Jr. and Michael P. Ziaylek on a "Retaining And Retrieval Apparatus For Storage Of A Ladder Upon A Vehicle Shelf Area"; and U.S. Pat. No. 5,538,100 patented Jul. 23, 1996 to R. I. Hedley on an "Access Device"; and U.S. Pat. No. 5,632,591 patented May 27, 1997 to K. R. Henriquez on a "Ladder Storage And Transport Device"; and U.S. Pat. No. 5,687,813 patented Nov. 18, 1997 to C. J. Bensch and assigned to The U.S. of America as represented by the Secretary of the Army on a "Vehicle Boarding Device"; and U.S. Pat. No. 5,743,702 patented Apr. 28, 1998 to M. J. Gunderson on a "Method And Apparatus For A Vehicle Mounted Hoisting System"; and U.S. Pat. No. 5,850,891 patented Dec. 22, 1998 to J. J. Olms et al and assigned to Trimble Navigation Limited on a "Motorized Rack System"; and U.S. Pat. No. 5,878,836 patented Mar. 9, 1999 to I Huang on a "Structure Of An Escaping Device"; and U.S. Pat. No. 5,918,488 patented Jul. 6, 1999 to D. L. Deeter on a "Ladder Lock"; and U.S. Pat. No. 5,967,257 patented Oct. 19, 1999 to R. O. Begin et al on a "Folding Escape/Rescue Ladder"; and U.S. Pat. No. 5,988,316 patented Nov. 23, 1999 to R. I. Hedley and assigned to Justoy Pty Ltd. on an "Access Device"; and U.S. Pat. No. 6,003,633 patented Dec. 21, 1999 to R. G. Rolson and assigned to Robert G. Rolson on a "Portable Truck or Trailer Ladder Assembly"; and U.S. Pat. No. 6,012,545 patented Jan. 11, 2000 to E. Faleide on a "Foldable Vehicle Ladder System"; and U.S. Pat. No. 6,029,775 patented Feb. 29, 2000 to R. I. Hedley et al and assigned to Justoy Pty Ltd. on an "Access Device".

SUMMARY OF THE INVENTION

The present invention provides a ladder pivotally attached to a generally vertically extending surface which is designed to be movable outwardly therefrom to increase the climbing inclination to make climbing easier for those persons making use of the ladder. The ladder configuration normally includes a main rail extending downwardly along the vertical surface such that it extends approximately parallel to the vertical surface whenever the ladder is in the retracted position. The main rail also preferably defines an upper main end in the upper areas adjacent to the vertically extending surface and a lower main end near the lowermost end closer to the normal walking surface adjacent to the vertically extending surface.

The upper main end preferably is pivotally attached with respect to the vertical surface in order to allow the main rail configuration to pivot away from the vertical surface to an extended position extending outwardly therefrom in order to increase the climbing inclination with respect to the vertical surface and facilitate climbing.

In the preferred configuration the main rail assembly includes a first main rail member extending downwardly along the vertical surface and extending approximately parallel thereto responsive to being in the retracted position. This first main rail member is also preferably pivotally attached with respect to the vertical surface to allow pivoting thereof away from the vertical surface to the extended position.

In a similar manner a second main rail member is included which extends downwardly along the vertical surface at a position spatially disposed from the first main rail member to facilitate use of both of these rail members during climbing. This second main rail member also extends approximately parallel to the vertical surface responsive to being in the retracted position. The second main rail member is also pivotally attached with respect to the vertical surface to allow pivoting thereof away from the vertical surface to the extended position.

An upper bracket may preferably be included which is fixedly secured to the vertical surface at a distance spatially remote from the walking surface. Normally the upper bracket will be positioned adjacent the upper main end of the main rail to be pivotally secured to both the first main rail and the second main rail member in order to facilitate pivotal movement thereof with respect to the vertical surface. The upper bracket is adapted also to space the upper main end outwardly from the vertical surface to facilitate climbing upon the ladder.

A plurality of steps are also included each secured with respect to the main rail means and preferably with respect to both the first and second main rail members such as to be spatially disposed vertically with respect to one another in order to facilitate climbing. Each of these steps preferably extends horizontally in a horizontal direction.

A scissors assembly is also included pivotally secured to the lower main end of the main rail in such a manner as to be pivotally attached with respect to the vertical surface to control relative positioning of the main rail with respect to the vertical surface responsive to being in the extended and/or retracted position. This scissors assembly is preferably operative to maintain the lower main end means positioned generally parallel to the vertically extending surface responsive to the main rail being in the retracted position. It is also operative to maintain the lower main end positioned extending further outwardly from the vertically extending surface responsive to the main rail being in the extended position to facilitate climbing thereupon by decreasing the climbing inclination thereof.

Said scissors assembly includes a scissors lock link pivotally secured to the lower main end of the main rail. This scissors lock link preferably is formed of a first scissors lock link member pivotally secured to the first main rail member as well as a second scissors lock link member spatially disposed from the first scissors lock link member and pivotally secured with respect to the second main rail member.

A scissors slave link is also pivotally attached with respect to the vertical surface. This scissors slave link also is pivotally attached with respect to the scissors lock link in order to facilitate controlling of the distance between the lower main end of the main rail and the vertical surface thereadjacent for facilitating control of the climbing inclination of the main rail. The scissors lock link and the scissors slave link are pivotal to a position extending approximately linearly outwardly away from one another responsive to the main rail means being in the extended position. The scissors lock link and the scissors slave link are extendable upwardly approximately adjacent with respect to one another responsive to the main rail being in the retracted position.

The scissors slave link preferably includes a first scissors slave link member pivotally attached with respect to the vertical surface as well as a second scissors slave link member spatially disposed from the first scissors slave link member and pivotally attached with respect to the vertical surface.

A locking tab may also be included fixedly secured to the scissors lock link and pivotally extending toward the scissors slave link thereadjacent to be in abutment therewith selectively to prevent pivotal movement of the scissors assembly to an inoperable over center position responsive to movement of the main rail to the extended position. This locking tab can include a first locking tab member fixedly secured to the first scissors lock link member and positioned extending toward the first scissors slave link member in such a manner as to be in abutment therewith selectively to prevent pivotal movement of the scissors assembly to the over center position responsive to movement of the first main rail member to the extended position. In a similar manner the second locking tab member may be included fixedly secured to the second scissors lock link member and spatially disposed from the first locking tab member in such a manner as to be positioned extending toward the second scissors slave link member to be selectively capable of abutment therewith to prevent pivotal movement of the scissors assembly to an over center position.

A deployment handle may also be included attached to the point of pivotal connection between the scissors lock link and the scissors slave link to facilitate movement of the scissors lock link and the scissors slave link to facilitate urging of the main rail between the retracted and extended position as desired. This deployment handle is preferably positioned extending laterally from the point of pivotal securement of the first scissors lock link member and the first scissors slave link member to the point of pivotal securement between the second scissors lock link member and the second scissors slave link member in such a manner as to facilitate movement of the scissors assembly and the first main rail member and the second main rail member between the retracted and the extended positions as selectively desired.

It is also possible that the present invention will include a lower bracket member fixedly secured to the vertically extending surface and pivotally secured to the scissors slave link in order to provide a pivotal attachment between the scissors slave link and the vertically extending surface.

The present invention also preferably includes a folding rail pivotally secured to the lower main end of the mail rail and movable between a deployed position extending generally downwardly therefrom to facilitate use of the ladder and a storage position extending upwardly along the main rail to facilitate retracted storage thereof. The folding rail is preferably extendable upwardly along the main rail opposite from the vertical surface responsive to the main rail being in the retracted position for storage thereof. It is also extendable downwardly from the main rail responsive to the main rail means being in the extended position to facilitate climbing thereupon by providing steps for climbing thereon immediately adjacent to the walking surface. The folding rail means preferably includes a first folding rail member pivotally secured to the first main rail member and movable between a deployed position extending generally downwardly therefrom to facilitate use thereof and a storage position extending upwardly along the first main rail member to facilitate storage thereof.

Similarly a second folding rail member will preferably be pivotally secured to the second main rail member and spatially disposed from the first folding rail member. This second folding rail member will be movable between a deployed position extending generally downwardly therefrom to facilitate use and a storage position extending upwardly along the second main rail member to facilitate retracted storage thereof.

It is an object of the present invention to provide a ladder which is pivotally attached to a generally vertically extending surface to be movable outwardly therefrom to decrease the climbing inclination thereof wherein reliability is an important consideration.

It is an object of the present invention to provide a ladder which is pivotally attached to a generally vertically extending surface to be movable outwardly therefrom to decrease the climbing inclination thereof wherein exposure to inclement weather does not degrade performance.

It is an object of the present invention to provide a ladder which is pivotally attached to a generally vertically extending surface to be movable outwardly therefrom to decrease the climbing inclination thereof wherein initial capital outlay cost is minimized.

It is an object of the present invention to provide a ladder which is pivotally attached to a generally vertically extending surface to be movable outwardly therefrom to decrease the climbing inclination thereof wherein maintenance requirements are minimized.

It is an object of the present invention to provide a ladder which is pivotally attached to a generally vertically extending surface to be movable outwardly therefrom to decrease the climbing inclination thereof wherein down time is substantially reduced.

It is an object of the present invention to provide a ladder which is pivotally attached to a generally vertically extending surface to be movable outwardly therefrom to decrease the climbing inclination thereof wherein a ladder extending up a wall can be more easily climbed especially by emergency personnel wearing heavy garments and carrying heavy emergency items.

It is an object of the present invention to provide a ladder which is pivotally attached to a generally vertically extending surface to be movable outwardly therefrom to decrease the climbing inclination thereof wherein a ladder extending up the side of an emergency vehicle can easily be clamped into a storage position to enhance vehicle mobility.

It is an object of the present invention to provide a ladder which is pivotally attached to a generally vertically extending surface to be movable outwardly therefrom to decrease the climbing inclination thereof wherein a ladder extending up the side of an emergency vehicle can be easily deployed at an inclined angle to facilitate use thereof in an emergency situation.

It is an object of the present invention to provide a ladder which is pivotally attached to a generally vertically extending surface to be movable outwardly therefrom to decrease the climbing inclination thereof wherein a deployment handle is easily positioned to allow extremely rapid movement of a ladder between an inclined position of usage and a generally vertically extending position for storage.

It is an object of the present invention to provide a ladder which is pivotally attached to a generally vertically extending surface to be movable outwardly therefrom to decrease the climbing inclination thereof wherein a folding rail section is provided for extending the ladder downwardly from the lowermost edge of the vertically extending wall surface of an emergency vehicle to a point adjacent the ground therebelow.

BRIEF DESCRIPTION OF THE DRAWINGS

While the invention is particularly pointed out and distinctly claimed in the concluding portions herein, a preferred embodiment is set forth in the following detailed description which may be best understood when read in connection with the accompanying drawings, in which:

DETAILED DESCRIPTION OF THE PREFERRED EMBODIMENT

Figure 2:
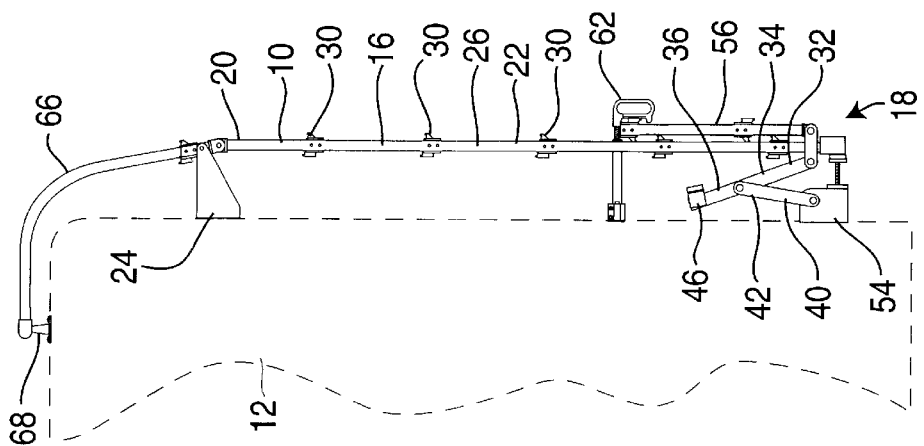
FIG. 2 is a side plan view of an embodiment of the ladder configuration of the present invention shown in the retracted or storage position.
Figure 1:
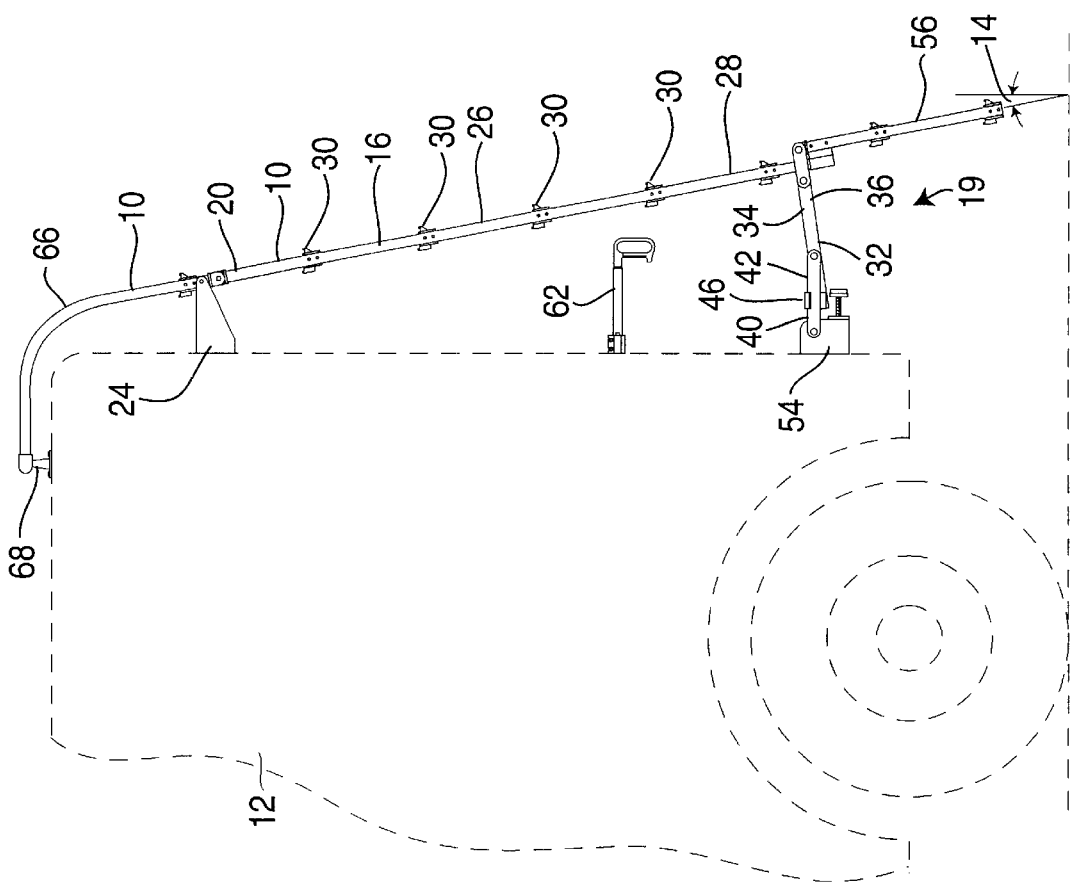
FIG. 1 is a side plan view of an embodiment of the ladder configuration of the present invention shown in the extended or deployed position.

The present invention provides a unique configuration of a ladder 10 which is movably attached to a vertically extending surface such as the side of a vehicle 12. The configuration of the ladder 10 of the present invention is operable with any vertically extending surface 12 but it is particularly useful with a vertically extending surface as shown in FIGS. 1 and 2 on the rear or side of an emergency vehicle. Such vehicles normally store the heavier equipment in the more secure locations on top of the vehicle. In an emergency situation personnel must climb such a ladder 10 in order to have access to this often heavy equipment. The present invention provides a ladder which is easier to use by decreasing of the angle of inclination thereof in such a manner that personnel and, in particular emergency personnel, can easily retrieve items from areas on top of emergency vehicles or above vertically extending walls.

Figure 3:
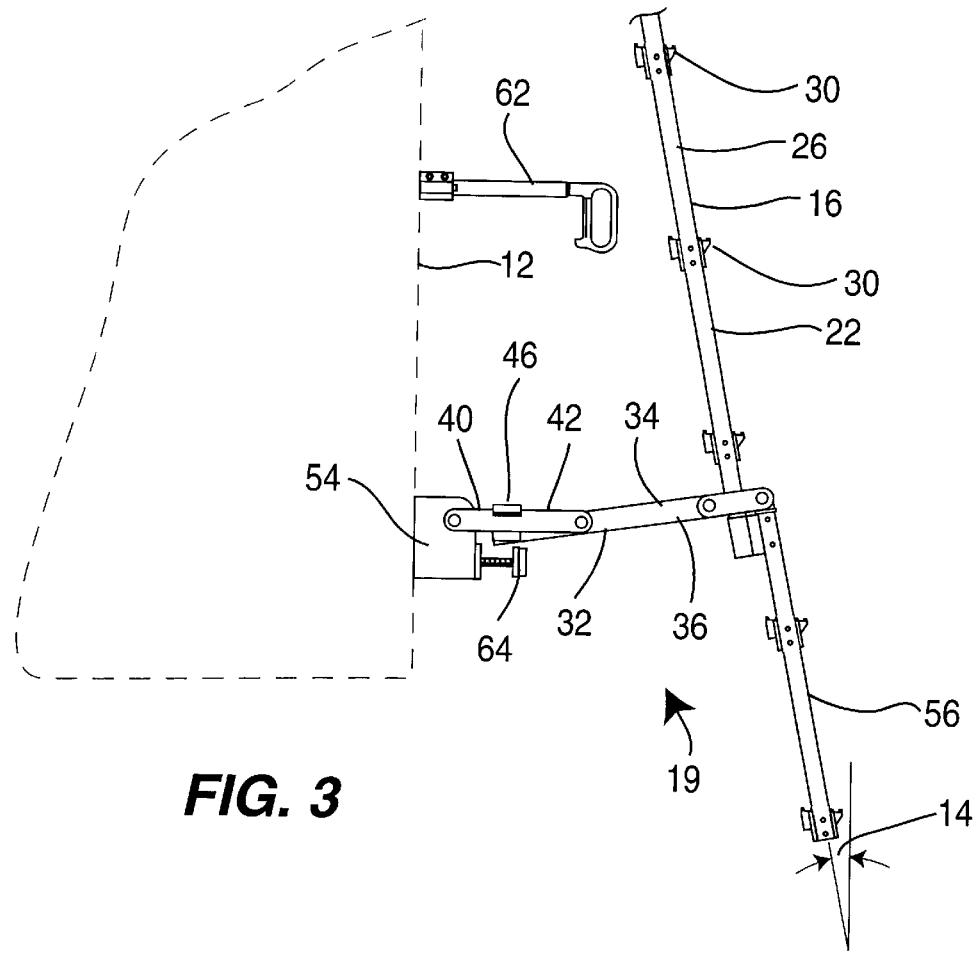
FIG. 3 is an expanded view of FIG. 1 showing the details of the clamping mechanism and the scissors assembly when deployed.

The climbing inclination 14 is shown best in FIGS. 1 and 3. The most difficult climbing inclination is zero and as the angle 14 increases the ease of climbing increases significantly.

In the apparatus of the present invention a main rail means 16 is provided which is pivotally secured at the upper end with respect to the vehicle side surface 12. The main rail means 16 is movable between a retracted position 18 as shown best in FIGS. 2 and 4 and at extended position 19 as shown best in FIGS. 1 and 3. The extended position 19 makes the ladder 10 ready for usage and the retracted position 18 is the position of storage.

The main rail 16 preferably includes a first main rail member 26 and a second mail rail member 28 extending vertically with a plurality of horizontally oriented steps 30 extending therebetween to form the configuration of the ladder. The main rail 16 also preferably includes an upper end 20 pivotally secured with respect to the vertical surface 12 and a lower end 22 which moves away from the vertical surface 12 responsive to pivoting of the upper end 20 from the storage position to the extended position.

The movement of the mail rail 16 between the extended position 19 and the retracted position 18 is controlled by a scissors assembly 32. Scissors assembly 32 includes a scissors lock link 34 pivotally secured with respect to the lower end 22 of the main rail 16. Scissors assembly 32 also preferably includes a scissors slave link 40 which is pivotally secured with respect to the lower area of the vertical surface 12. In a preferred configuration as shown in FIGS. 1 through 6, a lower bracket 54 is included fixedly secured to the vertical surface 12 adjacent to the scissors assembly 32. This lower bracket 54 facilitates control of the spacing of the main rail means 16 by keeping at least a minimum distance away from the vertical surface 12. Also the lower bracket 54 provides a pivotally movable mounting location for the scissors slave link 40 which is preferably pivotally movable and yet attached with respect to the vertical surface 12.

Figure 5:
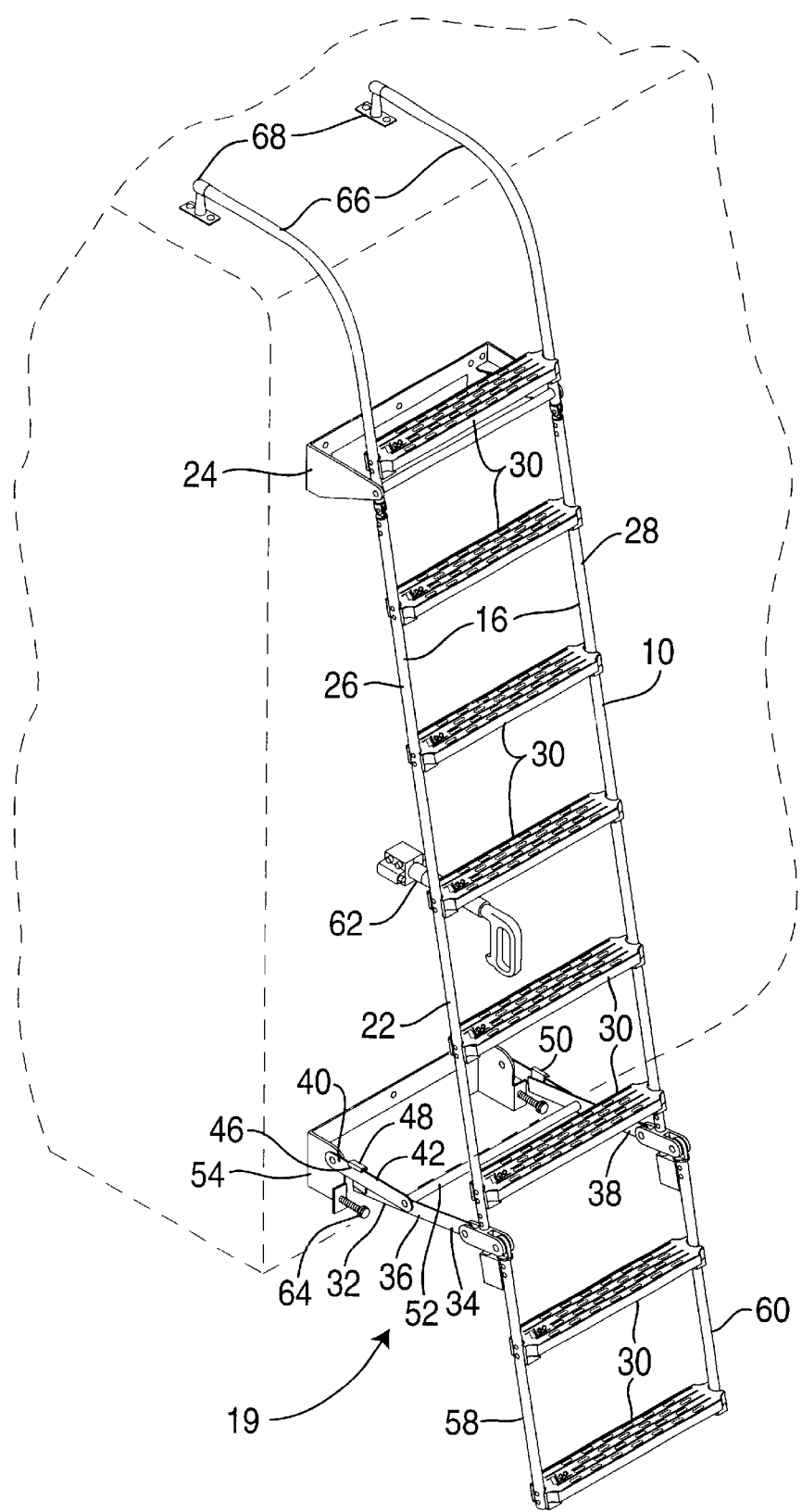
FIG. 5 is a front view of an embodiment of the ladder of the present invention shown in the deployed position.
Figure 6:
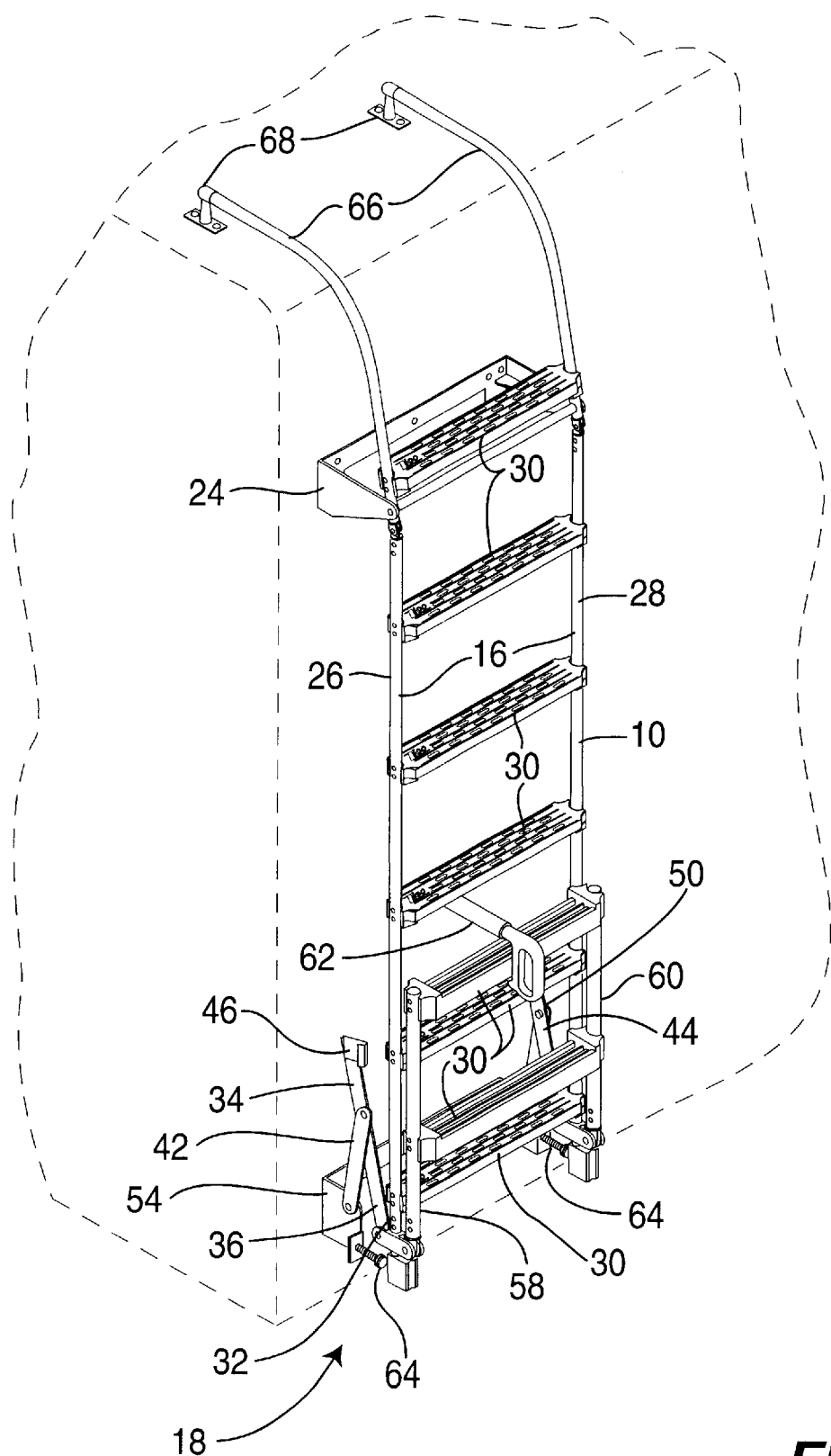
FIG. 6 is a front view of an embodiment of the ladder of the present invention shown in the storage position.

In the preferred configuration the scissors lock link 34 and scissors slave link 40 are also pivotally secured with respect to one another. In this preferred configuration, as shown in FIGS. 5 and 6, the scissors lock link will include a first scissors lock link member 36 and a second scissors lock link member 38 spatially disposed from one another and each being pivotally mounted with respect to the first main rail member 26 and the second mail rail member 28, respectively. In a similar manner the scissors slave link 40 will define a first scissors slave link member 42 and a second scissors slave link member 44 both pivotally mounted with respect to the lower bracket 54. With this configuration the first scissors slave link member 42 will also be pivotally secured to the first scissors lock link member 36. In a similar manner the second scissors slave link member 44 will be pivotally secured with respect to the second scissors lock link member 38.

A locking tab means 46 may also be included secured with respect to the scissors lock link in order to prevent movement of the scissors assembly to an over center position. In the preferred configuration this locking tab 46 will include a first locking tab member 48 fixedly secured to the first scissors lock link member 36 extending around and selectively in abutment with the first scissors slave link member 42 to prevent movement thereof to an over center position which could over extended usage in this manner render the scissors assembly inoperable.

In a similar manner a second locking tab member 50 may be included fixedly secured with respect to the second scissors lock link member 38 in such a manner as to be selectively abuttable with respect to the second scissors slave link member 44 to prevent movement thereof to the over center position to in this manner prevent any damaging to the scissors assembly 32 during usage thereof.

A deployment handle 52 is preferably included in the present invention and is secured to the scissors assembly at the point of pivot between the scissors lock link 34 and the scissors slave link 40. In the most preferred configuration as shown in FIGS. 5 and 6 the deployment handle 52 will extend between the point of pivotal securement of the first scissors lock link member 36 with respect to the first scissors slave link member 42 and the point of securement between the second scissors lock link member 38 and the second scissors slave link member 44. With this configuration the deployment handle 52 will extend approximately horizontally between these pivotal points of connection and will provide a means for causing movement of the scissors assembly 32 and the ladder 10 of the present invention between the deployed position and the storage position.

As shown in FIGS. 1 through 6 of the present invention, movement of the deployment handle downwardly will cause the ladder 10 and, in particular the main rail 16 of the present invention, to pivot outwardly to the extended position for usage. Pulling upwardly on the deployment handle 52 will on the other hand cause movement of the main rails 16 of the present invention to the storage position with the scissors lock link and the scissors slave link extending upwardly at an acute angle with respect to one another and almost parallel with respect to one another.

Figure 4:
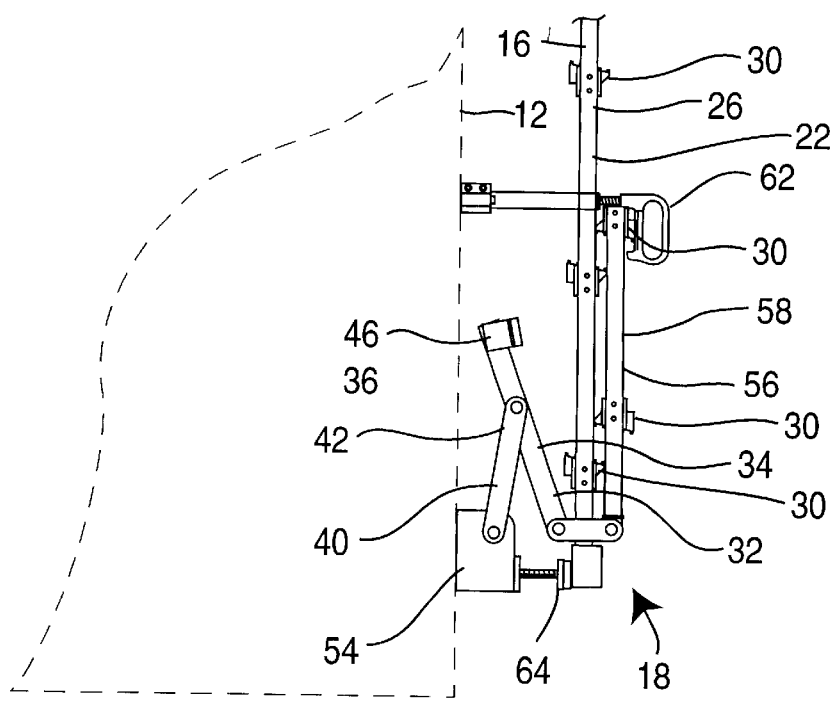
FIG. 4 is an expanded view of FIG. 1 showing the detail of the clamping mechanism and the scissors assembly in the storage position.

To further facilitate usage of the present invention a folding rail 56 may be included adapted to extend downwardly from the lower end 22 of the main rail 16. When used with a vehicle at least one foot of road clearance is normally included and this requires the first step to be rather high especially for emergency personnel wearing heavy outfits or carrying heavy equipment. As such, the folding rail 56 of the present invention is adapted to be movable between an upwardly extending storage position as shown in FIGS. 2 and 4 to a downwardly extending deployed position as shown in FIGS. 1 through 3. In the preferred configuration the folding rail 56 will include a first folding rail member 58 and a second folding rail member 60 with at least one or more individual steps 30 extending therebetween to make the first step somewhat shorter than would normally be required with such a vehicle.

In order to retain the main rail 16 in the storage position and to maintain the folding rail 56 in the upwardly folded storage position a resiliently biased clamping means 62 is included. This clamping means may be movably secured with respect to the vertical surface 12 in such a manner as to grip the main rail 16 or one of the steps 30 or grip the folding rail 56 or one of the steps 30 extending from the folding rail 56. With the configuration as shown in FIG. 2 the resiliently biased clamping means 62 grips the lowermost step 30 of the folding rail 56 for holding both the folding rail 56 and the main rail resiliently biased in the storage position extending approximately parallel with respect to the vertical surface 12. When released, however, the main rail 16 and the folding rail assembly 56 can easily move to the deployed position for usage.

To further minimize the extent of movement of the main rail 16 as it pivots to the storage position a bumper stop 64 can be included adapted to be abutted by any portion of the ladder 10 in such a manner as to limit the extent of movement thereof toward the vertical surface 12 and provide full control of the storage position thereof.

The present invention may also include an additional ladder section defined as the fixed rail section 66 which may extend upwardly from the point of pivotal connection of the main rail 16 with respect to the upper bracket 24. Normally this fixed rail 66 will be secured to the upper bracket 24 fixedly and will extend upwardly and be secured to a fixed rail bracket 68 secured to the vertical surface 12 at a point above or spaced from the upper bracket 24. This fixed rail 66 is not designed to move but is designed to be used by an emergency worker for climbing further upwardly beyond the height otherwise capable merely by climbing of the pivotable main rail section 16.

While particular embodiments of this invention have been shown in the drawings and described above, it will be apparent, that many changes may be made in the form, arrangement and positioning of the various elements of the combination. In consideration thereof it should be understood that preferred embodiments of this invention disclosed herein are intended to be illustrative only and not intended to limit the scope of the invention.

We claim:

1. A ladder pivotally attached to a generally vertically extending surface to be movable outwardly therefrom to decrease the climbing inclination thereof comprising:
    A. a main rail extending downwardly along said vertical surface and extending approximately parallel thereto responsive to being in the retracted position, said main rail defining an upper main end and a lower main end, said upper main end being pivotally attached with respect to the vertical surface to allow said main rail to pivot away from the vertical surface to an extended position extending outwardly therefrom for decreasing the climbing inclination thereof with respect to the vertical surface to facilitate climbing thereupon;
    B. a plurality of steps each secured to said main rail spatially disposed vertically with respect to one another in order to facilitate climbing thereupon;
    C. a scissors assembly pivotally secured to said lower main end of said main rail and being pivotally attached with respect to the vertical surface to control relative positioning of said main rail with respect to the vertical surface responsive to being in the extended position and the retracted position, said scissors assembly comprising:
        (1) a scissors lock link pivotally secured to said lower main end of said main rail; and
        (2) a scissors slave link pivotally attached with respect to the vertical surface, said scissors slave link also being pivotally attached with respect to said scissors lock link in order to facilitate controlling of the distance between said lower main end of said main rail and the vertical surface thereadjacent for facilitating control of the climbing inclination of said main rail, said scissors lock link and said scissors slave link means extending upwardly approximately adjacent with respect to one another responsive to said main rail being in the retracted position;
        (3) a locking tab fixedly secured to said scissors lock link and positioned extending toward said scissors slave link to be in abutment therewith to prevent pivotal movement of said scissors assembly to an inoperable over center position responsive to movement of said main rail to the extended position; and
    D. a folding rail pivotally secured to said lower main end of said main rail and movable between a deployed position extending generally downwardly therefrom to facilitate use of the ladder and a storage position extending upwardly along said main rail to facilitate retracted storage thereof.

2. A ladder pivotally attached to a generally vertically extending surface to be movable outwardly therefrom to decrease the climbing inclination thereof as defined in claim 1 wherein said folding rail extends upwardly along said main rail opposite from the vertical surface when located in the storage position.

3. A ladder pivotally attached to a generally vertically extending surface to be movable outwardly therefrom to decrease the climbing inclination thereof as defined in claim 2 wherein said folding rail is extendable upwardly along said main rail opposite from the vertical surface responsive to said main rail being in the retracted positioned for storage thereof and is extendable downwardly from said main rail responsive to said main rail being in the extended position to facilitate use thereof.

4. A ladder pivotally attached to a generally vertically extending surface to be movable outwardly therefrom to decrease the climbing inclination thereof as defined in claim 1 further comprising an upper bracket fixedly secured to the vertical surface adjacent said upper main end of said main rail and pivotally secured thereto to facilitate pivotal movement of said main rail with respect to the vertical surface, said upper bracket adapted to space said upper main end outwardly from the vertical surface to facilitate climbing thereupon.

5. A ladder pivotally attached to a generally vertically extending surface to be movable outwardly therefrom to decrease the climbing inclination thereof as defined in claim 1 wherein said scissors lock link and said scissors slave link are pivotable to a position extending approximately linearly outwardly away from one another responsive to said main rail being in the extended position.

6. A ladder pivotally attached to a generally vertically extending surface to be movable outwardly therefrom to decrease the climbing inclination thereof as defined in claim 1 wherein said scissors assembly further includes a deployment handle attached thereto to facilitate movement of said scissors lock link and said scissors slave link to facilitate urging movement of said main rail between the retracted position and the extended position.

7. A ladder pivotally attached to a generally vertically extending surface to be movable outwardly therefrom to decrease the climbing inclination thereof as defined in claim 6 wherein said deployment handle is attached to said scissors lock link and said scissors slave link at the point of pivotal securement therebetween to facilitate urging of movement thereof as desired.

8. A ladder pivotally attached to a generally vertically extending surface to be movable outwardly therefrom to decrease the climbing inclination thereof as defined in claim 1 wherein said scissors assembly is operative to maintain said lower main end positioned generally parallel to the vertically extending surface responsive to said main rail being in the retracted position and being operative to maintain said lower main end positioned extending further outwardly from the vertically extending surface responsive to said main rail being in the extended position to facilitate climbing thereupon by decreasing the climbing inclination thereof.

9. A ladder pivotally attached to a generally vertically extending surface to be movable outwardly therefrom to decrease the climbing inclination thereof as defined in claim 1 further including a lower bracket fixedly secured to the vertically extending surface and pivotally secured to said scissors slave link to provide a pivotal attachment between said scissors slave link and the vertically extending surface.

10. A ladder pivotally attached to a generally vertically extending surface to be movable outwardly therefrom to decrease the climbing inclination thereof as defined in claim 1 wherein said main rail comprises:
   A. a first main rail member extending downwardly along said vertical surface and extending approximately parallel thereto responsive to being in the retracted position, said first main rail member being pivotally attached with respect to the vertical surface to allow pivoting thereof away from the vertical surface to the extended position; and
   B. a second main rail member extending downwardly along said vertical surface spatially disposed from said first main rail member to facilitate use of said first and second main rail members during climbing thereof, said second main rail member also extending approximately parallel to the vertical surface responsive to being in the retracted position, said second main rail member also being pivotally attached with respect to the vertical surface to allow pivoting thereof away from the vertical surface to the extended position.

11. A ladder pivotally attached to a generally vertically extending surface to be movable outwardly therefrom to decrease the climbing inclination thereof as defined in claim 10 wherein said steps each extend approximately horizontally between said first main rail member and said second main rail member to facilitate climbing thereon.

12. A ladder pivotally attached to a generally vertically extending surface to be movable outwardly therefrom to decrease the climbing inclination thereof as defined in claim 11 wherein said folding rail comprises:
   A. a first folding rail member pivotally secured to said first main rail member and movable between a deployed position extending generally downwardly therefrom to facilitate use thereof and a storage position extending upwardly along said first main rail member to facilitate retracted storage thereof; and
   B. a second folding rail member pivotally secured to said second main rail member and spatially disposed from said first folding rail member, said second folding rail member being movable between a deployed position extending generally downwardly therefrom to facilitate use thereof and a storage position extending upwardly along said second main rail member to facilitate retracted storage thereof.

13. A ladder pivotally attached to a generally vertically extending surface to be movable outwardly therefrom to decrease the climbing inclination thereof as defined in claim 10 wherein said scissors assembly includes:
   A. a first scissors lock link member pivotally secured to said first main rail member;
   B. a second scissors lock link member spatially disposed from said first scissors lock link member and pivotally secured to said second main rail member;
   C. a first scissors slave link member pivotally attached with respect to the vertical surface; and
   D. a second scissors slave link member spatially disposed from said first scissors slave link member and pivotally attached with respect to the vertical surface.

14. A ladder pivotally attached to a generally vertically extending surface to be movable outwardly therefrom to decrease the climbing inclination thereof as defined in claim 13 wherein said scissors assembly further includes:
   A. a first locking tab member fixedly secured to said first scissors lock link member and positioned extending toward said first scissors slave link member to be in abutment therewith selectively to prevent pivotal movement of said scissors assembly to an over center position responsive to movement of said first main rail member to the extended position; and
   B. a second locking tab member fixedly secured to said second scissors lock link member spatially disposed from said first locking tab member and positioned extending toward said second scissors slave link member to be in abutment therewith selectively to prevent pivotal movement of said scissors assembly to an over center position responsive to movement of said second main rail member to the extended position.

15. A ladder pivotally attached to a generally vertically extending surface to be movable outwardly therefrom to decrease the climbing inclination thereof as defined in claim 14 wherein said deployment handle is positioned extending laterally from the point of pivotal securement of said first scissors lock link member and said first scissors slave link member to the point of pivotal securement between said second scissors lock link member and said second scissors slave link member to facilitate movement of said scissors assembly and said first main rail member and said second main rail member between the retracted position and the extended position.

16. A ladder pivotally attached to a generally vertically extending surface to be movable outwardly therefrom to decrease the climbing inclination thereof as defined in claim 1 further comprising a resiliently biased clamping means secured to the vertical surface and adapted to selectively attach said main rail thereto in the retracted position and simultaneously adapted to selectively attach said folding rail thereto in the storage position.

17. A ladder pivotally attached to a generally vertically extending surface to be movable outwardly therefrom to decrease the climbing inclination thereof as defined in claim 1 further comprising a bumper stop fixedly secured to the vertical surface and adapted to selectively abut said main rail to maintain same in spaced relation with respect to the vertical surface and approximately parallel thereto in the retracted position.

18. A ladder pivotally attached to a generally vertically extending surface to be movable outwardly therefrom to decrease the climbing inclination thereof as defined in claim 1 further comprising a fixed railing secured to said upper main end of said main rail and fixedly secured with respect to the vertical surface to prevent pivoting thereof, said fixed railing means providing further access to the uppermost areas of the vertical surface.

19. A ladder pivotally attached to a generally vertically extending surface to be movable outwardly therefrom to decrease the climbing inclination thereof comprising:
   A. a main rail extending downwardly along said vertical surface and extending approximately parallel thereto responsive to being in the retracted position, said main rail defining an upper main end and a lower main end, said upper main end being pivotally attached with respect to the vertical surface to allow said main rail to pivot away from the vertical surface to an extended position extending outwardly therefrom for decreasing the climbing inclination thereof with respect to the vertical surface to facilitate climbing thereupon;

B. an upper bracket fixedly secured to the vertical surface adjacent said upper main end of said main rail and pivotally secured thereto to facilitate pivotal movement of said main rail with respect to the vertical surface, said upper bracket adapted to space said upper main end outwardly from the vertical surface to facilitate climbing thereupon;

C. a plurality of steps each secured to said main rail spatially disposed vertically with respect to one another in order to facilitate climbing thereupon;

D. a scissors assembly pivotally secured to said lower main end of said main rail and being pivotally attached with respect to the vertical surface to control relative positioning of said main rail with respect to the vertical surface responsive to being in the extended position and the retracted position, said scissors assembly being operative to maintain said lower main end positioned generally parallel to the vertically extending surface responsive to said main rail being in the retracted position and being operative to maintain said lower main end positioned extending further outwardly from the vertically extending surface responsive to said main rail being in the extended position to facilitate climbing thereupon by decreasing the climbing inclination thereof, said scissors assembly comprising:

(1) a scissors lock link pivotally secured to said lower main end of said main rail;

(2) a scissors slave link pivotally attached with respect to the vertical surface, said scissors slave link also being pivotally attached with respect to said scissors lock link in order to facilitate controlling of the distance between said lower main end of said main rail and the vertical surface thereadjacent for facilitating control of the climbing inclination of said main rail, said scissors lock link and said scissors lock link being pivotable to a position extending approximately linearly outwardly away from one another responsive to said main rail being in the extended position, said scissors lock link and said scissors lock link being extendable upwardly approximately adjacent with respect to one another responsive to said main rail being in the retracted position;

(3) a locking tab fixedly secured to said scissors lock link means and positioned extending toward said scissors slave link means to be in abutment therewith to prevent pivotal movement of said scissors assembly to an inoperable over center position responsive to movement of said main rail to the extended position;

(4) a deployment handle attached to the point of pivotal connection between said scissors lock link and said scissors slave link to facilitate movement of said scissors lock link and said scissors slave link to facilitate urging movement of said main rail between the retracted position and the extended position;

E. a lower bracket fixedly secured to the vertically extending surface and pivotally secured to said scissors slave link to provide a pivotal attachment between said scissors slave link and the vertically extending surface; and F. a folding rail pivotally secured to said lower main end of said main rail and movable between a deployed position extending generally downwardly therefrom to facilitate use of the ladder and a storage position extending upwardly along said main rail to facilitate retracted storage thereof, said folding rail being extendable upwardly along said main rail opposite from the vertical surface responsive to said main rail being in the retracted positioned for storage thereof and being extendable downwardly from said main rail responsive to said main rail being in the extended position to facilitate climbing thereupon.

20. A ladder pivotally attached to a generally vertically extending surface to be movable outwardly therefrom to decrease the climbing inclination thereof comprising:

A. a main rail extending downwardly along said vertical surface and extending approximately parallel thereto responsive to being in the retracted position, said main rail defining an upper main end and a lower main end, said upper main end being pivotally attached with respect to the vertical surface to allow said main rail to pivot away from the vertical surface to an extended position extending outwardly therefrom for decreasing the climbing inclination thereof with respect to the vertical surface to facilitate climbing thereupon, said main rail comprising:

(1) a first main rail member extending downwardly along said vertical surface and extending approximately parallel thereto responsive to being in the retracted position, said first main rail member being pivotally attached with respect to the vertical surface to allow pivoting thereof away from the vertical surface to the extended position;

(2) a second main rail member extending downwardly along said vertical surface spatially disposed from said first main rail member to facilitate use of said first and second main rail members during climbing thereof, said second main rail member also extending approximately parallel to the vertical surface responsive to being in the retracted position, said second main rail member also being pivotally attached with respect to the vertical surface to allow pivoting thereof away from the vertical surface to the extended position;

B. an upper bracket fixedly secured to the vertical surface adjacent said upper main end of said main rail and pivotally secured thereto to facilitate pivotal movement of said main rail with respect to the vertical surface, said upper bracket adapted to space said upper main end outwardly from the vertical surface to facilitate climbing thereupon;

C. a plurality of steps each secured to said main rail spatially disposed vertically with respect to one another in order to facilitate climbing thereupon, each of said steps extending approximately horizontally between said first main rail member and said second main rail member to facilitate climbing thereon;

D. a scissors assembly pivotally secured to said lower main end of said main rail and being pivotally attached with respect to the vertical surface to control relative positioning of said main rail with respect to the vertical surface responsive to being in the extended position and the retracted position, said scissors assembly being operative to maintain said lower main end positioned generally parallel to the vertically extending surface responsive to said main rail being in the retracted position and being operative to maintain said lower main end positioned extending further outwardly from the vertically extending surface responsive to said main rail being in the extended position to facilitate climbing thereupon by decreasing the climbing inclination thereof, said scissors assembly comprising:
(1) a scissors lock link means pivotally secured to said lower main end of said main rail, said scissors lock link including:
 (a) a first scissors lock link member pivotally secured to said first main rail member;
 (b) a second scissors lock link member spatially disposed from said first scissors lock link member and pivotally secured to said second main rail member;
(2) a scissors slave link pivotally attached with respect to the vertical surface, said scissors slave link also being pivotally attached with respect to said scissors lock link in order to facilitate controlling of the distance between said lower main end of said main rail and the vertical surface thereadjacent for facilitating control of the climbing inclination of said main rail, said scissors lock link and said scissors slave link being pivotable to a position extending approximately linearly outwardly away from one another responsive to said main rail being in the extended position, said scissors lock link and said scissors slave link being extendable upwardly approximately adjacent with respect to one another responsive to said main rail being in the retracted position, said scissors slave link including:
 (a) a first scissors slave link member pivotally attached with respect to the vertical surface;
 (b) a second scissors slave link member spatially disposed from said first scissors slave link member and pivotally attached with respect to the vertical surface;
(3) a locking tab fixedly secured to said scissors lock link and positioned extending toward said scissors slave link to capable of being in abutment therewith to prevent pivotal movement of said scissors assembly to an inoperable over center position responsive to movement of said main rail to the extended position, said locking tab means further including:
 (a) a first locking tab member fixedly secured to said first scissors lock link member and positioned extending toward said first scissors slave link member to be capable of being in abutment therewith selectively to prevent pivotal movement of said scissors assembly to an over center position responsive to movement of said first main rail member to the extended position;
 (b) a second locking tab member fixedly secured to said second scissors lock link member spatially disposed from said first locking tab member and positioned extending toward said second scissors slave link member to be capable of being in abutment therewith selectively to prevent pivotal movement of said scissors assembly to an over center position responsive to movement of said second main rail member to the extended position;
(4) a deployment handle attached to the point of pivotal connection between said scissors lock link and said scissors slave link to facilitate movement of said scissors lock link and said scissors slave link to facilitate urging movement of said main rail between the retracted position and the extended position, said deployment handle being positioned extending laterally from the point of pivotal securement of said first scissors lock link member and said first scissors slave link member to the point of pivotal securement between said second scissors lock link member and said second scissors slave link member to facilitate movement of said scissors assembly and said first main rail member and said second main rail member between the retracted position and the extended position;
E. a lower bracket fixedly secured to the vertically extending surface and pivotally secured to said scissors slave link to provide a pivotal attachment between said scissors slave link and the vertically extending surface;
F. a folding rail pivotally secured to said lower main end of said main rail and movable between a deployed position extending generally downwardly therefrom to facilitate use of the ladder and a storage position extending upwardly along said main rail to facilitate retracted storage thereof, said folding rail being extendable upwardly along said main rail opposite from the vertical surface responsive to said main rail being in the retracted positioned for storage thereof and being extendable downwardly from said main rail responsive to said main rail being in the extended position to facilitate climbing thereupon, said folding rail comprising:
(1) a first folding rail member pivotally secured to said first main rail member and movable between a deployed position extending generally downwardly therefrom to facilitate use thereof and a storage position extending upwardly along said first main rail member to facilitate retracted storage thereof; and
(2) a second folding rail member pivotally secured to said second main rail member and spatially disposed from said first folding rail member, said second folding rail member being movable between a deployed position extending generally downwardly therefrom to facilitate use thereof and a storage position extending upwardly along said second main rail member to facilitate retracted storage thereof.

* * * * *